(12) United States Patent
Kamath et al.

(10) Patent No.: US 10,587,650 B2
(45) Date of Patent: Mar. 10, 2020

(54) COMMUNICATIONS SECURITY

(71) Applicant: DETICA PATENT LIMITED, Dublin, Dublin (IE)

(72) Inventors: Uday Krishna Kamath, Ashburn, VA (US); Kevin O'Leary, Dublin (IE); Kilian Colleran, Dublin (IE)

(73) Assignee: Detica Patent Limited, Dublin (IE)

( * ) Notice: Subject to any disclaimer, the term of this patent is extended or adjusted under 35 U.S.C. 154(b) by 172 days.

(21) Appl. No.: 15/106,442

(22) PCT Filed: Dec. 19, 2014

(86) PCT No.: PCT/US2014/071341
§ 371 (c)(1),
(2) Date: Jun. 20, 2016

(87) PCT Pub. No.: WO2015/095631
PCT Pub. Date: Jun. 25, 2015

(65) Prior Publication Data
US 2016/0337399 A1      Nov. 17, 2016

(30) Foreign Application Priority Data
Dec. 20, 2013    (EP) .................................... 13198766

(51) Int. Cl.
*H04L 29/06*     (2006.01)
*H04L 12/26*     (2006.01)

(52) U.S. Cl.
CPC ........ *H04L 63/1466* (2013.01); *H04L 43/106* (2013.01); *H04L 43/14* (2013.01); *H04L 63/1408* (2013.01)

(58) Field of Classification Search
CPC ... H04L 63/1466; H04L 43/106; H04L 43/14; H04L 63/0428; H04L 63/1408; H04L 63/1425
See application file for complete search history.

(56) References Cited

U.S. PATENT DOCUMENTS 7,913,302 B2 *   3/2011   Shraim ................ G06Q 10/107
                                          713/170
8,015,133 B1    9/2011   Wu et al.
(Continued)

FOREIGN PATENT DOCUMENTS

WO    WO 2009/065056 A2    5/2009

OTHER PUBLICATIONS

"HomeTPS: Uncovering what is happening in home networks" Kuai Xu; Feng Wang; Michael Lee 2012 IEEE Consumer Communications and Networking Conference (CCNC) Year: 2012 pp. 40-41 IEEE Conference Publications.*
(Continued)

*Primary Examiner* — Jung W Kim
*Assistant Examiner* — Sameera Wickramasuriya
(74) *Attorney, Agent, or Firm* — Scully, Scott, Murphy & Presser, PC

(57) ABSTRACT

A method is provided for detecting an interception of a communications session established by a user over a network, comprising the steps of: (i) monitoring communications sessions by the user over a profile time period to capture information identifying distinct communications to one or more identified network addresses and their timing over the profile time period; (ii) monitoring communications sessions within the profile time period to capture information characterising the content of transactions initiated in respect of said one or more network addresses; (iii) using the captured information to generate a profile characterising communications sessions established in respect of said one or more network addresses over the profile time period; and (iv) monitoring communications sessions with said one or more network addresses within a configurable detection time period to determine one or more measures of deviation from the profile generated at step (iii) thereby to detect the (Continued)

presence of an interception occurring within the detection time period.

11 Claims, 7 Drawing Sheets

(56) References Cited

U.S. PATENT DOCUMENTS

| | | | | |
|---|---|---|---|---|
| 8,145,560 | B2* | 3/2012 | Kulkarni | G06Q 40/00 |
| | | | | 379/114.14 |
| 8,966,036 | B1* | 2/2015 | Asgekar | G06Q 50/01 |
| | | | | 707/706 |
| 9,185,095 | B1* | 11/2015 | Moritz | H04L 63/102 |
| 9,361,652 | B2* | 6/2016 | Su | G06Q 50/01 |
| 2002/0133721 | A1* | 9/2002 | Adjaoute | G06Q 20/04 |
| | | | | 726/23 |
| 2006/0218278 | A1* | 9/2006 | Uyama | G06Q 10/04 |
| | | | | 709/226 |
| 2007/0245420 | A1 | 10/2007 | Yong et al. | |
| 2007/0261112 | A1 | 11/2007 | Todd et al. | |
| 2008/0034425 | A1 | 2/2008 | Overcash et al. | |
| 2008/0059474 | A1 | 3/2008 | Lim | |
| 2009/0199296 | A1* | 8/2009 | Xie | G06F 21/316 |
| | | | | 726/23 |
| 2011/0320816 | A1 | 12/2011 | Yao et al. | |
| 2012/0071131 | A1* | 3/2012 | Zisapel | H04L 63/1408 |
| | | | | 455/410 |
| 2012/0221955 | A1 | 8/2012 | Raleigh et al. | |

OTHER PUBLICATIONS

Zaiane, Osmar R., Man Xin, and Jiawei Han. "Discovering web access patterns and trends by applying OLAP and data mining technology on web logs." Proceedings IEEE International Forum on Research and Technology Advances in Digital Libraries—ADL'98—. IEEE, 1998. (Year: 1998).*

Saxena, Kanak, and Rahul Shukla. "Significant interval and frequent pattern discovery in web log data." arXiv preprint arXiv: 1002.1185 (2010). (Year: 2010).*

Chitraa, V., and Dr Antony S Thanamani. "Web log data cleaning for enhancing mining process." Int. J. Commun. Comput. Technol 1.03 (2012):7. (Year: 2012).*

International Search Report dated Mar. 23, 2015 issued in PCT/US2014/071341.

Extended European Search Report dated Jun. 2, 2014 issued in EP 13198766.1.

* cited by examiner

50

| Web Log Id | Web User Id | Current Time | Web Page Id |
|---|---|---|---|
| 1001 | User 1 | 16/05/2012 10:01 | Page 1 |
| ⋮ | | | |
| 1009 | User 1 | 16/05/2012 10:03 | Page 2 |
| ⋮ | | | |
| 1037 | User 1 | 16/05/2012 10:07 | Page 7 |
| ⋮ | | | |
| 1053 | User 1 | 16/05/2012 10:09 | Page 4 |

55   60   65   70

80

| User Id | Web Page Id | Memory Last | Record |
|---|---|---|---|
| User 1 | Page 1 | - | - |
| User 1 | Page 2 | Page 1 | Page 1 to Page 2 - Count 1 |
| User 1 | Page 7 | Page 2 | Page 2 to Page 7 - Count 1 |
| User 1 | Page 4 | Page 7 | Page 7 to Page 4 - Count 1 |

| Count / How x | Page 1 | Page 2 | | Page 4 | | | Page 7 |
|---|---|---|---|---|---|---|---|
| Page 1 | | 1 | | | | | 2 |
| Page 2 | | | | | | | 10 |
| | | | | | | | |
| Page 4 | | | | | | | |
| | | | | | | | |
| | | | | | | | |
| Page 7 | | 3 | | 5 | | | |

120

| User Id | Page Transitions | Statistics |
|---|---|---|
| User 1 | Page 3 to Page 4 | Average (1)<br>Count (3)<br>Dev (1) |
| User 1 | Page 4 to Page 6 | Average (1)<br>Count (4)<br>Dev (1.3) |
| ⋮ | ⋮ | ⋮ |

| Id | Amount | Transaction Time | Transaction Type | Account Id |
|---|---|---|---|---|
| 1 | $20 | 10:00  05/06 | Debit | User 1 |
| 2 | $40 | 10:01  05/06 | Debit | User 1 |
| 3 | $10 | 10:05  06/06 | Credit | User 1 |
| ⋮ | | | | |

| |
|---|
| Amount Spent 3 days = Sum of Amount (type = debit) between now and (now - 3 days) |
| Amountof Credit 2 days = Sum of Amount (type = crebit) between now and (now - 2 days) |
| ⋮ |

| User 1 | | User 2 | |
|---|---|---|---|
| Page 1 | 10:00 05/06 | Page 3 | 10:00 05/06 |
| Page 2 | 10:03 05/06 | Page 6 | 10:08 05/06 |
| ⋮ | | ⋮ | |
| Page 7 | 10:07 05/06 | | |
| ⋮ | | | |

*Fig. 9*

COMMUNICATIONS SECURITY

The present invention relates to secured data communications, in particular but not exclusively to the detection of an interception of data communications as may occur, for example, when a user's access to an otherwise secure service over a network is subject to a fraudulent interception.

The present invention finds particular application in the detection of unauthorised software executing at a user's terminal processing equipment from which a communications session has been initiated, or at a data processing point through which data passes, either situation providing an opportunity for a fraudulent interception of the communications session.

'Interception' may include monitoring or capture of data being communicated within a communications session or it may relate to the insertion or replacement of data within the session or the initiation of data access requests or transactions within the session or within a newly created session.

From a first aspect, the present invention resides in a method for detecting an interception of a communications session established by a user over a network, comprising the steps of:
(i) monitoring communications sessions by the user over a first profile time period to capture information identifying distinct communications to one or more identified network addresses and their timing over said first profile time period;
(ii) monitoring communications sessions over said first profile period to capture information characterising the content of transactions initiated in respect of said one or more network addresses;
(iii) using the captured information to generate a profile characterising communications sessions established in respect of said one or more network addresses over said first profile time period; and
(iv) monitoring communications sessions with said one or more network addresses over a configurable detection time period to determine one or more measures of deviation from the profile generated at step (iii) thereby to detect the presence of an interception occurring within the detection time period.

Preferred embodiments of the present invention are directed to the detection of behavioural differences in the way a user interacts over a network with a service or information provider. The inventors have realised that users develop particular patterns of behaviour when interacting with certain online services, for example banking or retail web sites. Fraudulent intrusion into a real-time communications session which is otherwise secured by the service provider provides an opportunity for a fraudster to gain access to key logon credentials or to conduct their own fraudulent transactions after a legitimate user has established a communications session with the service provider. However, by developing a profile of a user's legitimate behaviour with particular service provider web sites, there is a basis for identifying divergent behaviour which might be due to a fraudulent interception.

Preferably, the information identifying communications sessions comprises at least an identifier for the respective user, information identifying a network address being accessed and timing information. Such data provides a basic set of information to begin to develop a user profile. However, to provide a richer set of information, more specific to the content of messages a user generates, step (ii) of the method preferably further comprises monitoring communications sessions over, additionally, at least a second profile time period, different to the first, to capture information characterising the content of transactions initiated in respect of said one or more network addresses during said at least a second profile time period. In particular, the information characterising the content of transactions comprises one or more data items selected from: information identifying a category of transaction initiated by the user; information identifying another party to a transaction; information identifying volumetric data in transactions.

In a preferred embodiment, the user profile includes one or more types of characterising information selected from: one or more statistics relating to network addresses accessed within any such profile time period; one or more statistics relating to a predetermined category of transaction initiated within any such profile time period; one or more statistics relating to a user's transition between network addresses within any such profile time period; one or more statistics derived from communications activity by the user taking place over multiple such profile time periods.

In a preferred implementation, step (iv) comprises monitoring the communications sessions at a computer from which the user initiated the communications sessions. However, anticipating other potential points of interception by a fraudster, step (iv) preferably comprises monitoring the communications sessions at a point within a communications path between a computer from which the user initiated each of the communications sessions and a respective network destination.

From a second aspect, the present invention resides in an apparatus for detecting an interception of a communications session established by a user over a network, comprising:
an acquisition engine for capturing data relating to communications sessions established between a user's computer and respective network addresses;
an analytics engine for processing data captured by the acquisition engine and for generating one or more profiles comprising metrics characterising a user's communications activity over one or more profile time periods;
a store for storing user profiles generated by the analytics engine,
wherein, the analytics engine is arranged to receive data captured by the acquisition engine relating to a user's communications activity during a predetermined detection time period and for comparing one or more metrics derived from the data captured during the detection period with corresponding metrics contained in a stored profile for the user, thereby to detect divergent communications activity potentially indicative of an interception of the user's communications and to generate a corresponding alert.

Preferably, the acquisition engine is arranged to capture, for each of the communications sessions: data providing an identifier for a respective user; information identifying one or more network addresses being accessed; and timing information. However, for a richer set of information on which to develop a user profile, the acquisition engine is arranged to capture information relating to the content of one or more such communications sessions.

In a preferred embodiment, the analytics engine is arranged to derive from data captured by the acquisition engine one or more characterising metrics derived from or comprising information selected from: one or more statistics relating to network addresses accessed within a profile time period by a user; one or more statistics relating to a predetermined category of transaction initiated within the profile time period by a user; one or more statistics relating to a user's transition between network addresses within the profile time period; one or more statistics derived from communications activity by the user taking place over multiple profile time periods; and one or more statistics relating to information characterising the content of transactions associated with a user.

From a third aspect, the present invention resides in a digital processor arranged to implement an interception detection method according to the first aspect defined above. However, in view of the potential volumes of data that need to be captured and processed, in particular if the present invention is implemented to operate on behalf of a number of network users, the apparatus may further comprise hardware logic means arranged to implement one or more steps in the interception detection method in hardware and to interact with the digital processor in a preferred implementation of the method.

From a fourth aspect, the present invention resides in a computer program product comprising a computer-readable medium having stored thereon, or means for accessing, software code means which when loaded and executed on a computer are arranged to implement an interception detection method according to the first aspect of the present invention.

Preferred embodiments of the present invention will now be described in more detail and by way of example only with reference to the accompanying drawings, of which:

FIG. 4 is a table representing a record of web page transitions identifiable by preferred embodiments of the present invention in a typical web log;

FIG. 6 represents a 'Markovian' behaviour profile for a user, derived from captured web log data by preferred embodiments of the present invention;

FIG. 7 represents a portion of a transaction log captured by preferred embodiments of the present invention from a user's monitored activity when using an online banking service;

FIG. 8 represents various statistics calculated for a user based upon their used of an online banking service and used to form a profile for the user by preferred embodiments of the present invention; and FIG. 9 is a table representing 'click-time' data captured in respect of different users by preferred embodiments of the present invention from web log and other data sources.

There are a number of techniques used by fraudsters to gain access to secure facilities, for example online banking or online shopping facilities, with the aim of stealing money or arranging fraudulent purchases of goods or services. As countermeasures continue to improve to combat online interception of data in transit, so fraudsters have needed to find other ways in which to gain access to secure facilities or to bypass security measures.

It is known for fraudsters to launch phishing attacks using e-mail or text messaging, inducing a user to follow a link to a fraudulent look-alike web site. In such attacks, the user is induced to supply login credentials which may then be captured and used in a subsequent fraudulent access, initially without the user's knowledge. For example, the fraudulent web site may replicate the 'look and feel' of an otherwise familiar online banking web site until the user has entered their login details from which point the login attempt will apparently fail and the user will be diverted to the legitimate web site to re-enter their login details, being led to believe that they'd made a typing error the first time. Meanwhile, the login credentials have been captured for later, fraudulent use.

Another technique involves installing 'malware' on a user's computer which, when activated, is able to monitor or to intercept data being entered by the user when accessing a secure facility online. Such software may not only capture security credentials being entered at the user's keyboard but it may, alternatively or additionally, 'hi-jack' the user's session once the user has logged in to the facility, mimicking the user giving instructions to transfer money, make purchases, etc. The hi-jacking software may even allow a fraudster to simulate a user's interactions with the site from a remote location, over the network. The user may or may not be aware of the software's presence until after the fraud has been committed.

A preferred embodiment of the present invention is directed to the detection of fraudulent software executing on a user's computer or at any platform within a communications path between the user's computer and a particular network destination, or to detect the effects of a human intervention of real-time communications taking place at the user's computer or at any point within that communications path for the purposes of session hi-jacking. A preferred apparatus for detecting activity symptomatic of the presence of such software or intervention will now be described with reference to FIG. 1.

Figure 1:
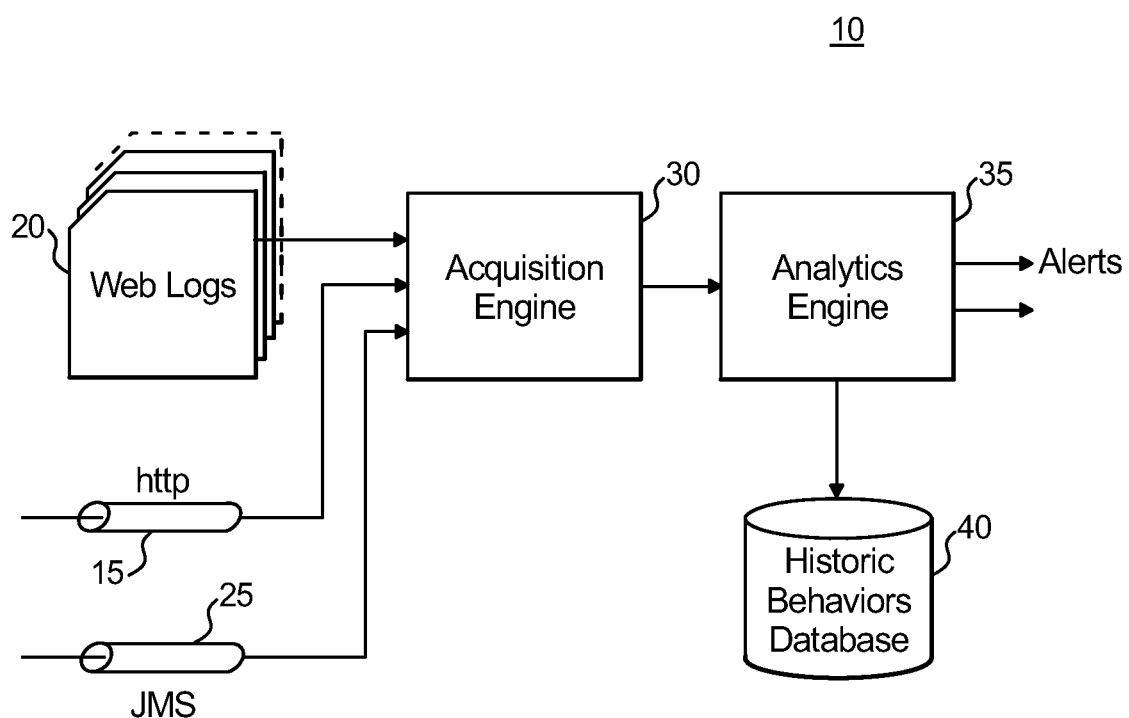
FIG. 1 is a functional block diagram for an interception detection apparatus for implementing preferred embodiments of the present invention.

Referring to FIG. 1, a functional block diagram is shown of an apparatus 10 for capturing, as input, http request messages 15 outgoing from a user's computer, weblogs 20 generated as a result of internet browsing activity by the user over time and other forms of messaging such as Java Message Service (JMS) messages 25. Data may also be captured using data probes placed at strategic points within a network, for example at an interface between a telecommunications service provider's network and the Internet, or at a point of entry to key online service provider networks, such as those of banks or other financial institutions sharing the benefit of fraud detection by the present invention. Each of the captured data types are input to an acquisition engine 30, either substantially in real-time or as a batch process, where the data are pre-processed to extract certain key data items. For example, for each identifiable web page access attempt, a user identifier, a destination web page address (URL) and the date and time of each access request may be extracted.

The data items captured and extracted by the acquisition engine 30 are passed to an analytics engine 35 either as they are captured or as a batch process. In outline, the acquisition engine 35 is arranged to generate and to maintain, for each identifiable user, a user behaviour profile based upon a history of web page transitions by the user within a particular service domain, for example between pages of an online banking service, or between online service or other information providers, with associated timings and other information derived from observed transactions. Profiles may also be generated representative of a user's transactional behaviour, for example in the way they use their online banking service. Behaviour profiles are stored in a historic behaviours database 40. The profiles are used by the analytics engine 35 to detect any significant divergence from modelled behaviour in the captured data 15, 20, 25, in various respects, as a means to detect malware in action on a user's computer or elsewhere within a respective communications path.

Preferred behavioural modelling techniques applied by the analytics engine 35 will now be described in more detail, additionally with reference to FIGS. 2 to 9, beginning with a derivation of a user profile based upon navigation between web pages.

Figures 2, 3:
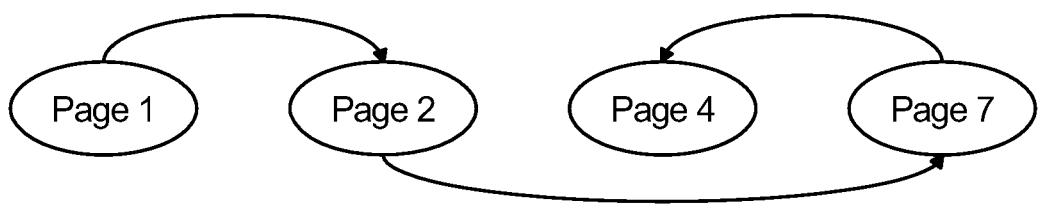
FIG. 2 shows a portion of a typical web log for use as a source of data for the present invention.
FIG. 3 is a representation of a chain of web page transitions identifiable by preferred embodiments of the present invention from the web log portion in FIG. 2.

Referring initially to FIG. 2, a table 50 represents a portion of a typical weblog 20 input to the acquisition engine 30, or as compiled by the acquisition engine 30 from monitored http sessions 15 established by users of a computer being monitored. In this example, the table 50 shows a series of four records captured for a specific user, designated as 'user 1'. The records in the table 50 comprise details of monitored web page transitions and may be ordered according to the timing of the source transactions. Four data types are included in the table 50: Weblog Identifier, 55; Web User Identifier, 60; Current Time, 65; and Web Page Identifier, 70. The Weblog Id. 55 may be a unique number incremented sequentially and allocated to each new web transaction as it is recorded in the weblog 20. The Web User Id. 60 is a unique identifier allocated to each distinct user of the monitored computer. If required, the identifier 60 may be an explicit reference to an identifiable user, or it may be an anonymised reference to a user. The Current Time 65 may be the date and time of capture of the transaction details in the Weblog 20, or it may be a date and time derived from another source to indicate the time that the recorded transaction was initiated by the user. The Web Page Id. 70 may comprise the universal resource locator (URL) of a web page requested by the user, or it may be another form of address such as an IP address for the location from which the requested page was supplied. The page may be identified alternatively by a unique identifier allocated by a process that generates the weblog 20 or by the acquisition engine 30 itself, if required.

Data output by the acquisition engine 30, for example in the form of the table 50 in FIG. 2, is input to the analytics engine 35 which has the objective of determining whether the series of web page transitions represented in those data are indicative of a fraudulent hi-jacking event on the user's computer. To enable the detection of such events, the analytics engine 35 is arranged to generate and to maintain, through update, a behavioural profile for each user of the computer being monitored. The analytics engine 35 is then arranged, on the basis of such profiles, to identify in received transaction data 50 fraudulent, divergent behaviour as soon as possible after it occurs. Various techniques for analysis by the analytics engine 35 will now be described, initially with reference to FIG. 3.

Referring to FIG. 3, a page transition diagram is shown to illustrate the web page transitions that may be extracted by the acquisition engine 35 from the table 50 of FIG. 2. If the request of a web page in an http request message is considered to be a 'state', then FIG. 3 may be considered a state transition diagram in what may be considered a Markovian process on the assumption that a transition to a given web page depends only upon the previous web page accessed. For a given user, the observed probabilities of making a transition from one state (web page) to another may form the basis of a user profile for that user. In particular, the user profile may be limited to considering web page transitions within the domain of a specific service provider, for example the user's online banking service provider, or it may be based upon all page transitions made by the user. The way in which a user moves between pages of an online banking service, for example, together with other information derived from the table 50 such as the time interval between page transitions, enables the analytics engine 35 to generate a profile for the user and to update it as more transaction data 50 are captured for that user. Such profiles are stored by the analytics engine 35 in the historic behaviours database 40.

As can be seen in FIG. 3, for this example the user—'user 1'—moved from web 'Page 1' to 'Page 2', then to 'Page 7' and then to 'Page 4'. A reference to the timing information 65 in FIG. 2 shows that the request for access to Page 2 occurred 2 minutes after that for Page 1, then 4 minutes later the user requested access to Page 7 followed 2 minutes later by the request for Page 4.

Over time, the analytics engine 35 may have captured the state transition history of 'user 1' and formed a behavioural profile for that user which may be updated from these latest observations. In a step to making such an update, or to generating a new profile for 'User 1', a count of the different page transitions is firstly derived from the latest weblog data 50, as shown in FIG. 4.

Referring to FIG. 4, a table 80 provides a count of the number of each page transition observed in the latest weblog data 50. Each record in the table 80 records a distinct page (state) transition, recording the Web User Id. 60 and the Web Page Id. 70 of the page visited, taken from the table 50 of FIG. 2. For each Web Page Id. 70, the previous Web Page Id. is recorded in the 'Memory Last' column, 85 and a count of the number of times the user was observed to have made that particular page transition in the captured weblog data 50 is recorded in the 'Record' column, 90. Trivially, in this example, the page transitions from Page 1 to Page 2, Page 2 to Page 7 and Page 7 to Page 4 were each observed only once. However, in general, the table 80 would contain the observations for all the users and all the monitored sessions for a predetermined period of time as represented in the captured weblog 20 or in the monitored sessions 15.

As will be apparent, the statistics captured in the table 80 may be used to update a set of state transition probabilities and other statistics derived for each user by the analytics engine 35 and recorded in the historic behaviours database 40. Those other statistics may include a running average number of times each type of page transition was made in a given time interval, for example over the 09:00 to 10:00 time interval each working day, and the total number of such page transitions over a predetermined time period, say 30 working days. A standard deviation in the transition counts may be calculated for the same time interval each day, in this example for the 09:00 to 10:00 time interval on the working days in a week, and updated each day. These statistics may provide one component of a user profile for each user. Another component of a user profile, relating to the timing of page (state) transitions, will now be described with reference to FIG. 5.

Figures 5A, 5B:
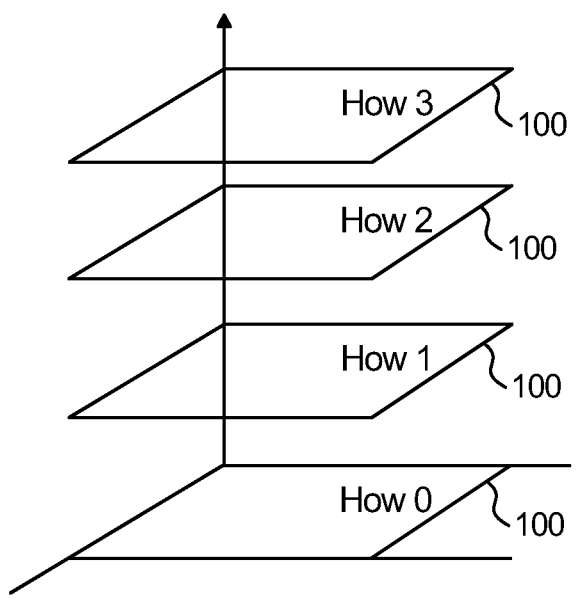
FIG. 5 is a table recording various page transition statistics calculable by preferred embodiments of the present invention from captured web log data.

Referring to FIG. 5, a table (FIG. 5*a*) 100 is shown to record, in the form of a matrix, the total number of page transitions requested by a particular user over a given time interval, in this example, of one hour. The number of each page transition may be derived from data accumulated in a table such as the table 80 of FIG. 4, with the table contents being recorded in the database 40 at the end of each elapsed hour and a new table started. In this example, the same pages 1, 2, 4 and 7 are represented as in the example above. The rows 105 in the table 100 represent a starting Web Page Id. and the columns 110 represent the Web Page Id. of the next requested page. Equivalently, the columns 110 may be considered to represent a current web page and the rows 105 to represent a previous web page. As can be seen from FIG.

5a, transitions from page 1 to page 2 occurred once, whereas transitions from page 2 to page 7 occurred 10 times in the one hour interval 'x'. The tables 100 may include records relating to all page transitions made by a user or they may record data in respect of only selected groups of web page transitions, for example those relating to particular online services. Such statistics may be captured by the acquisition engine 30 and the analytics engine 35 over time from weblogs 20 or monitored communications sessions 15, 25 as described above.

A matrix 100 of page transitions may be captured for each consecutive one hour time interval, in this example, to build up a three-dimensional matrix of page (state) transitions by the user, as represented in FIG. 5b. A record may be kept not only of the time of day, but each hour may also be characterised as being part of the user's working day, evening, usual sleeping time, or whether the day is a weekend day, public holiday, or other type of day particular to the user. Records may relate only to a predefined time interval each day, for example between the hours of 08:00 and 10:00. Furthermore, the matrices 100 may be recorded in respect of a particular service provider, for example the user's online banking service provider, recording transitions between those web pages making up the domain of that service, or between pages grouped by other criteria likely to provide meaningful information about the user's normal behaviours.

If a finer level of resolution is required then a matrix 100 may be recorded for shorter time intervals, one minute for example, to form an equivalent three-dimensional matrix profiling the user's activity over time. Longer time intervals of one hour or one day may then either be recorded separately or generated as required through aggregation of records for the shorter time intervals.

In a preferred implementation, the different elements of each user's profile data as outlined above may be updated continuously by the analytics engine 35 as new data are received from the acquisition engine 30. If the anticipated rate of receipt of data by the acquisition engine 30 exceeds the processing capability of a single processor, then the acquisition engine 30 and/or the analytics engine 35 may be implemented using a parallel processing arrangement so that, for example, data received in respect of different users, different monitored computers or data links or different online services may be processed by different real or virtual processors executing different processing threads, a new thread being initiated each time new data are incoming from a different source or in respect of a different online service and the thread terminated when those data have been processed. The profile data captured in the historic behaviours database 40 may be similarly partitioned so that dedicated real or virtual data storage areas may be established within the database 40 for access by each distinct processor or processing thread.

In order to detect abnormal behaviour in data captured by the acquisition engine 30, attributed to an identified user, the analytics engine 35 is arranged, preferably as a continuously running process, to calculate certain metrics from extracted weblog data, e.g. as presented to the analytics engine 35 in a table 50 such as that discussed above with reference to FIG. 2. The derived metrics may be used in a comparison with stored profile data for the respective user to detect abnormal behaviour over a given period of time. An example of the type of data that may be extracted from captured data in order to help detect abnormal behaviour over a given time period is shown in and will now be described with reference to FIG. 6.

Referring to FIG. 6, a table 120 captures various time series statistical measures relating to page transitions by users. In the particular example shown, three different statistical measures are calculated for a 'User 1' relating to two different page transitions, from a 'Page 3' to a 'Page 4' and from the 'Page 4' to a 'Page 6'. For each page transition, and for each of one or more configurable time intervals, for example one hour intervals over the immediately preceding 30 days—the 'profile period'—the statistical measures evaluated are: Average ( )—the average number of times the transition took place in each 1 hour interval over the 30 day profile period; Count ( )—the total number of times the page transition took place in each 1 hour interval over the 30 day profile period; and Dev ( )—the standard deviation in the Count ( ) values over the 30 day profile period. When data for a number of recent 1 hour intervals within a 'detection time period' are captured, the deviation in the Count ( ) values for the 1 hour periods of the detection time period are compared with the Average ( ) value for the 30 day profile period and the difference is expressed preferably as a number of the (30 day) standard deviations Dev ( ) A statistically significant deviation from the Average ( ) may be indicative of divergent behaviour and an alarm may be raised to investigate further. If a less responsive system is required, the statistics may be evaluated for longer time intervals, for example for each one day interval over a longer profile period, say the immediately preceding three month time period. Data for the most recent days—the detection period—may then be compared with the 3 month profile period statistics to look for evidence of a deviation from normal behaviour.

Besides observing page transitions and generating profiles for users based upon various measures derived from records of those page transitions, profile data may also be generated in respect of particular online services, for example by observing various details in the content of transactions conducted by the user of those online services. In the case of an online banking service, a profile for a user may include various statistics relating to the type, the value and the timing of transactions relating to an account held by the user. An example of the type of transaction data that may be used to generate or supplement a user profile is shown in FIG. 7. Such transaction data may be made available to the acquisition engine 30 by the online banking service provider.

Referring to FIG. 7, a portion of an online banking transaction log 150 is shown including three transactions relating to an account held by the user 'User 1'. The transaction log 150 includes, for each transaction: an identifier, 'Id'; the value, 'Amount'; the date and time, 'Transaction Time'; and the type, 'Transaction Type'. From the data contained in a transaction log such as the log 150, a behaviour profile may be generated for the account holder— 'User 1'—based upon the observed amounts, timing and types of transaction on that account. An example of such a profile will now be described with reference to FIG. 8.

Referring to FIG. 8, a table 170 may be generated for a user of an online banking service. In this specific example, two measures of transactional behaviour are shown in the table 170, although these may be only two out of a number of measures over different profile time periods. The first comprises a record of an average amount of money spent over the time intervals monitored for page transition metrics during the immediately preceding 3 day profile period, for example the 1 hour intervals used to generate the user profile represented in the table 120 of FIG. 6, and the second comprises an amount of money credited to the user's account over the same intervals but in the immediately preceding 2 day profile period. The 3 and 2 day profile periods may be configurable in respect of each user and of each online service as appropriate, as may be number of different profile periods for which such measures may be generated and maintained. In order to detect divergent behaviour, recently captured transaction data, for example over a configurable detection period, say the four most recent 1 hour intervals in this example, are compared with the longer term profile period statistics represented in the user's behavioural profile (over 3 and 2 days) to look for statistically significant deviations. Multiple detection time periods may be used and the deviation in behaviour for each detection period may be calculated and the results combined either to give an average deviation, a weighted average deviation with different user or service-specific weightings being applied to each detection period, or some other combination. The result is a value that can be compared with a threshold value for the user, the service or the combination, indicative of a potential interception or intrusion.

Preferably, by generating behavioural profiles that combine statistics relating to page transitions effected by a user within configurable time intervals and statistics relating to the detail of transactions conducted through those pages by the user over those same intervals and over the same or different profile time periods, a more reliable basis is provided for detecting divergent behaviour indicative of unauthorised interception.

Numerous other statistical measures over different configurable time intervals and profile periods may be devised according to the type of user, what combination of measures best characterises users of a particular online service and the level of responsiveness required.

A further preferred extension to behaviour profiling may include an analysis of the timing of page transitions for each user, for example those page transitions represented in the profiles 100 of FIG. 5. Data required to enable such analysis may be captured as for the page transition data described above. In particular, the time at which a user initiates a transition to each new web page—the 'Click-time'—may be captured by the Analytics Engine 35 from web log data 20, such as that extracted by the acquisition engine 30 and shown in the table 50 of FIG. 2, and recorded for each user in a form to be described with reference to FIG. 9.

Referring to FIG. 9, a sample 190 of captured click timings of page requests for each of two users, 'User 1' and 'User 2', are shown. These timings may be stored over a predetermined data retention period and may be used to derive and compare a number of different statistical measures of user behaviour over different profile time periods. For example, by looking at the differences in the click timings of page transitions for 'User 1' the average time spent on Page 1 might be calculated as 3 minutes with a standard deviation of 0.5 seconds over a profile period comprising the immediately preceding 10 days, for example. If the click times for those page transitions were to vary significantly in a newly observed transaction on a user's account, taking account of the observed spread in click times represented by the standard deviation over the profile period, then abnormal behaviour may be suspected and an alert generated.

While user behaviour profiles may comprise a number of different metrics, based upon appropriate time intervals and profile periods as discussed above, the different metrics may be weighted differently when determining the presence of an intrusion or interception. The weightings applied may be are user specific, online service-specific or they may take account of the combination of user and service being accessed. For example, for a given user accessing their online banking service, a greater weighting may be applied to measures of divergent behaviour based upon transaction statistics than to divergent behaviour based upon page transition timing when deciding whether there has been an interception of intrusion and whether to generate an alert. For another user, it may be more appropriate to weight the page transition metrics more highly than the transactional metrics, particularly where that user conducts transactions with a wide variety of values but with a relatively stable pattern of page transitions.

The invention is not limited to the specific embodiments described above, but may be varied through the application of different combinations of the features described to different applications without departing from the key principles of the present invention. Furthermore, certain functional features of the present invention may be implemented entirely in software executing on a digital processor or, in order to increase the speed of execution of certain high-demand functions, they may be implemented in hardware using field-programmable arrays (FPGAs) or equivalent configurable hardware devices, or by means of a combination of hardware and software. Data capture may be handled entirely by external systems and the results of that data capture may be supplied to the analytics engine 35 of the present invention or its functional equivalent. Any databases comprising user behavioural profiles generated by the present invention need not necessarily be incorporated within the apparatus of the present invention, but may optionally be located with or managed by external agencies or integrated with other databases as appropriate to each chosen application.

The invention claimed is:

1. A method for detecting unauthorized software executing at a user's terminal processing device, comprising the steps of:
   (i) monitoring, by a digital processor, communications sessions established by the user's terminal processing device over a plurality of profile time periods, and capturing information identifying distinct communications to one or more identified network addresses, transitions between network addresses and timing of the network address transitions over said plurality of profile time periods, the information being captured from weblogs generated as a result of internet browsing activity by the user at the user's terminal processing device;
   (ii) monitoring, by the digital processor, communications sessions over said plurality of profile time periods, and capturing information characterising the content of transactions initiated in respect of said one or more network addresses;
   (iii) generating, by the digital processor, a matrix of numbers of network address transitions for each of said plurality of profile time periods, the numbers of network address transitions in each matrix being from each of one or more previous web pages to each of one or more subsequent web pages requested by the user over a corresponding one of said plurality of profile time periods, the network address transitions being obtained from the monitored communications sessions;
   (iv) generating, by the digital processor, a 3D matrix of the network address transitions for said plurality of profile time periods;
   (v) generating, by the digital processor, a table of time series statistical measures relating to the network address transitions in the 3D matrix, the table including a plurality of the statistical measures relating to each network address transition in the table;

(vi) generating, by the digital processor, a profile characterising communications sessions established in respect of said one or more network addresses over said plurality of profile time periods based on the captured information, the generated 3D matrix and the time series statistical measures; and (vii) monitoring, by the digital processor, communications sessions with said one or more network addresses over a configurable detection time period to determine one or more measures of deviation from the profile generated at step (vi) thereby to detect unauthorized software executing at the user's terminal processing device occurring within the detection time period.

2. The method according to claim 1 wherein, at step (i), said information identifying communications sessions comprise at least an identifier for the respective user, information identifying a network address being accessed and timing information.

3. The method according to claim 1 wherein, at step (ii), said information characterising the content of transactions comprises one or more data items selected from: information identifying a category of transaction initiated by the user; information identifying another party to a transaction; information identifying volumetric data in transactions.

4. The method according to claim 1, wherein said time series statistical measures includes one or more types of characterising information selected from: one or more statistics relating to network addresses accessed within said plurality of profile time periods; one or more statistics relating to a predetermined category of transaction initiated within said plurality of profile time periods; one or more transition statistics relating to a user's transition between network addresses within said plurality of profile time periods, the transition statistics including a transition probability statistic; and one or more statistics derived from communications activity by the user taking place over multiple said plurality of profile time periods.

5. The method according to claim 1, wherein step (vii) comprises monitoring said communications sessions at a computer from which the user initiated said communications sessions.

6. The method according to claim 1, wherein step (vii) comprises monitoring said communications sessions at a point within a communications path between a computer from which the user initiated each of said communications sessions and a respective network destination.

7. An apparatus for detecting unauthorized software executing at a user's terminal processing device, comprising:

a digital processor configured to perform the steps of:

(i) monitoring, by a digital processor, communications sessions established by the user's terminal processing device over a plurality of profile time periods, and capturing information identifying distinct communications to one or more identified network addresses, transitions between network addresses and timing of the network address transitions over said plurality of profile time periods, the information being captured from weblogs generated as a result of internet browsing activity by the user at the user's terminal processing device;

(ii) monitoring, by the digital processor, communications sessions over said plurality of profile time periods, and capturing information characterising the content of transactions initiated in respect of said one or more network addresses;

(iii) generating, by the digital processor, a matrix of numbers of network address transitions for each of said plurality of profile time periods, the numbers of network address transitions in each matrix being from each of one or more previous web pages to each of one or more subsequent web pages requested by the user over a corresponding one of said plurality of profile time periods, the network address transitions being obtained from the monitored communications sessions;

(iv) generating, by the digital processor, a 3D matrix of the network address transitions for said plurality of profile time periods;

(v) generating, by the digital processor, a table of time series statistical measures relating to the network address transitions in the 3D matrix, the table including a plurality of the statistical measures relating to each network address transition in the table;

(vi) generating, by the digital processor, a profile characterising communications sessions established in respect of said one or more network addresses over said plurality of profile time periods based on the captured information, the generated 3D matrix and the time series statistical measures; and (vii) monitoring, by the digital processor, communications sessions with said one or more network addresses over a configurable detection time period to determine one or more measures of deviation from the profile generated at step (vi) thereby to detect unauthorized software executing at the user's terminal processing device occurring within the detection time period.

8. The apparatus according to claim 7, wherein the digital processor is arranged to capture information relating to the user's transactional behavior of each said communications session.

9. The apparatus according to claim 7, wherein the digital processor is arranged to derive one or more characterising metrics selected from: one or more statistics relating to network addresses accessed within a profile time period by a user; one or more statistics relating to a predetermined category of transaction initiated within the profile time period by a user; one or more transition statistics relating to a user's transition between network addresses within the profile time period, the transition statistics including a transition probability statistic; one or more statistics derived from communications activity by the user taking place over multiple profile time periods; and one or more statistics relating to information characterising the content of transactions associated with a user.

10. A computer program product comprising a non-transitory computer-readable medium having stored thereon, or means for accessing, software code means which when loaded and executed on a computer are arranged to implement a method for detecting unauthorized software executing at a user's terminal processing device, comprising the steps of:

(i) monitoring, by a digital processor, communications sessions established by the user's terminal processing device over a plurality of profile time periods, and capturing information identifying distinct communications to one or more identified network addresses, transitions between network addresses and timing of the network address transitions over said plurality of profile time periods, the information being captured from weblogs generated as a result of internet browsing activity by the user at the user's terminal processing device;

(ii) monitoring, by the digital processor, communications sessions over said plurality of profile time periods, and capturing information characterising the content of transactions initiated in respect of said one or more network addresses;

(iii) generating, by the digital processor, a matrix of numbers of network address transitions for each of said plurality of profile time periods, the numbers of network address transitions in each matrix being from each of one or more previous web pages to each of one or more subsequent web pages requested by the user over a corresponding one of said plurality of profile time periods, the network address transitions being obtained from the monitored communications sessions;

(iv) generating, by the digital processor, a 3D matrix of the network address transitions for said plurality of profile time periods;

(v) generating, by the digital processor, a table of time series statistical measures relating to the network address transitions in the 3D matrix, the table including a plurality of the statistical measures relating to each network address transition in the table;

(vi) generating, by the digital processor, a profile characterising communications sessions established in respect of said one or more network addresses over said plurality of profile time periods based on the captured information, the generated 3D matrix and the time series statistical measures; and (vii) monitoring, by the digital processor, communications sessions with said one or more network addresses over a configurable detection time period to determine one or more measures of deviation from the profile generated at step (vi) thereby to detect unauthorized software executing at the user's terminal processing device occurring within the detection time period.

11. The apparatus according to claim 7, wherein the digital processor is arranged to capture, for each said communications session: for each web page access attempt, data providing an identifier for a respective user; a destination web page address and date and time of each web page access request.

\* \* \* \* \*